July 16, 1968

W. PARKER 3,392,519

TEXTILE APPARATUS

Filed Jan. 30, 1967

INVENTOR
Walter Parker
BY
Michael J. Striker
ATTORNEY ary induction motor may comprise said projecting part of the tubular body.

The apparatus may also comprise power supply means

United States Patent Office 3,392,519
Patented July 16, 1968

3,392,519
TEXTILE APPARATUS
Walter Parker, Wilmslow, England, assignor to
Ernest Scragg & Sons Limited
Filed Jan. 30, 1967, Ser. No. 612,572
Claims priority, application Great Britain, Jan. 31, 1966,
42,405/66
27 Claims. (Cl. 57—77.45)

ABSTRACT OF THE DISCLOSURE

A drive for a false twister comprising a rotatable body, means for imparting a torque to said body and means for imparting an opposite torque to said body. The said opposite torque being regulated by the amount of rotation of said body in excess of a predetermined level of rotation.

---

Figure 1:
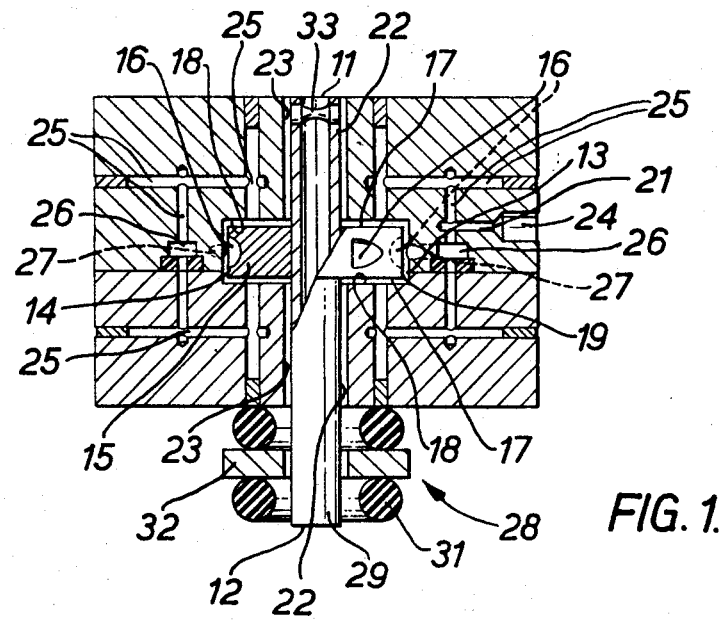

This invention relates to textile apparatus.

The invention comprises a method of controlling the speed of rotation of a rotatable body, wherein said rotatable body forms or is connected to the rotor of an auxiliary induction motor distinct from the main driving means for said rotatable body.

The invention also comprises a method of driving a rotatable body, wherein said rotatable body is driven by main driving means and forms or is connected to the rotor of an auxiliary induction motor distinct from said main driving means.

The main driving means may comprise a fluid pressure motor, which may comprise an air turbine, or the main driving means may comprise an electric motor. The rotatable body may be a false twist spindle for a yarn processing machine.

The invention also comprises apparatus adapted to control the speed of rotation of a rotatable body, wherein said body forms or is connected to the rotor of an auxiliary induction motor distinct from the main driving means for said body.

The invention also comprises apparatus adapted to drive a rotatable body, wherein said rotatable body is driven by main driving means and forms or is connected to the rotor of an auxiliary induction motor distinct from said main driving means.

Said main driving means may comprise a fluid pressure motor, which may comprise an air turbine.

The rotatable body may be tubular and may carry a rotor of an air turbine. Said rotor may comprise an enlarged cylindrical portion of said tubular body and may have in its periphery indentations forming cups into which air can be directed. Said enlarged portion may be located between the ends of said tubular body.

Said rotatable body may be supported in a fluid pressure bearing and said enlarged portion of said tubular body may have axially directed end faces adapted to co-operate with axially directed faces of a surrounding chamber to which air can be supplied, to form axial thrust air bearings for the tubular body. Peripheral surfaces of said tubular body may co-operate with radially directed faces of said surrounding chamber to form radial thrust air bearings for the tubular body.

The stator of said auxiliary induction motor may surround at least part of said tubular body, which may be a part other than said enlarged portion, and may be an end part of said tubular body, which may project from said fluid pressure bearing means. The rotor of said auxiliary induction motor may comprise said projecting part of the tubular body.

The apparatus may also comprise power supply means for the auxiliary induction motor, which may comprise means for selecting a synchronous speed of said motor.

The apparatus may also comprise power supply means for said main driving means, which may comprise a supply of pressure fluid such as air.

Both said power supply means may be adapted to supply a plurality of such auxiliary induction motors and main driving means.

Said rotatable body may be a false twist spindle for a yarn processing machine and may comprise twist locking means such as a twist pin.

The invention also comprises apparatus for false twisting yarn comprising apparatus as herein described in combination with yarn feed means, yarn setting means and yarn take-up means.

The invention also comprises a false twist machine comprising a plurality of said apparatus.

Figure 2:
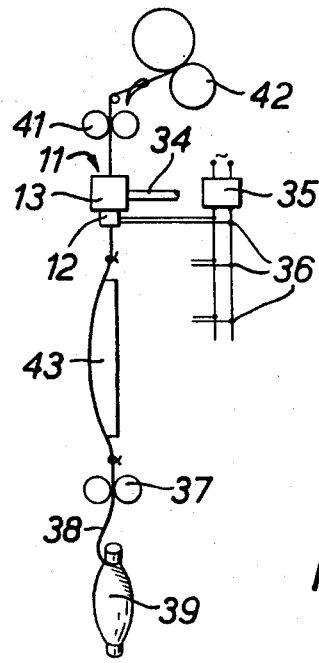

One embodiment of apparatus according to the invention will now be described with reference to the accompanying drawings in which FIGURE 1 is a sectional elevation of a false twist spindle driving arrangement, and FIGURE 2 is a diagrammatic elevation of yarn crimping apparatus.

FIGURE 1 illustrates apparatus adapted to control the speed of rotation of a rotatable body 11, wherein said body 11 forms or is connected to the rotor of an auxiliary induction motor 12 distinct from the main driving means 13 for said body 11.

Said main driving means 13 comprises a fluid pressure motor, in particular an air turbine.

The rotatable body 11 is tubular and carries the rotor 14 of the air turbine 13. Said rotor 14 comprises an enlarged cylindrical portion 15 of said tubular body 11 and has in its periphery indentations 16 forming cups into which air can be directed. The enlarged portion 15 is located between the ends of the tubular body 11.

The rotatable body 11 is supported in a fluid pressure bearing. Said enlarged portion 15 has axially directed end faces 17 adapted to cooperate with axially directed faces 18 of a surrounding chamber 19 to which air can be supplied through ducting 21, to form axial thrust air bearings for the tubular body 11. Peripheral surfaces 22 of said tubular body 11 co-operate with radially directed faces 23 of said surrounding chamber 19 to form radial thrust air bearings for the tubular body 11.

The ducting 21 comprises an inlet port 24, attachable to a supply of air, drillings 25 connecting said inlet duct 24 to openings in the faces 18, an annular duct 26 and ducts 27, directed tangentially to said rotor 14, connecting said inlet duct 24 to the chamber 19 to drive the rotor 14.

The stator 28 of the auxiliary induction motor 12 surrounds a part 29 of said tubular body 11 projecting from said fluid pressure bearing means 13, said part 29 being the rotor of the auxiliary induction motor 12. The stator 28 comprises field windings 31 and core laminations 32.

Power supply means for the auxiliary induction motor will comprise means for selecting a synchronous feed of said roller whereby to control the rate of rotation of said rotatable member 11.

When the air turbine is driving the rotatable part at said synchronous speed, the auxiliary induction motor exerts no torque on the rotatable part. When, however, the rotatable member accelerates or retards from said selected synchronous speed, the auxiliary induction motor will exert a torque on the rotatable member tending to restore its speed of rotation to said synchronous speed.

The rotatable body 11 is a false twist spindle for a yarn processing machine, and comprises a twist pin 33 around which yarn can be wrapped.

FIGURE 2 illustrates apparatus for false twist crimping yarn comprising a rotatable body 11 comprising the apparatus illustrated in FIGURE 1 connected to air supply means 34 and power supply means 35 for the auxiliary induction motor (shown having a plurality of power take-off points in a false twist crimping machine), in combination with yarn feed rollers 37 feeding yarn 38 from a bobbin 39, further feed rollers 41 and wind-up means 42, and a heater 43 for setting the false twist in the yarn 38 to crimp the yarn.

What we claim is:

1. A method of driving a rotatable body at a predetermined speed, comprising the steps of transmitting to such body a first torque normally sufficient to rotate the body at a predetermined speed; and transmitting to the body a second torque in response to deviation of the actual speed of the body from said predetermined speed, to thereby restore such actual speed to coincidence with said predetermined speed.

2. A method as defined in claim 1, wherein said first torque is transmitted to the body by a fluid-operated motor.

3. A method as defined in claim 1, wherein said second torque is transmitted to the body by an induction motor.

4. A method as defined in claim 1, wherein said first and second torque are respectively transmitted to the body by separate and distinct torque-producing instrumentalities.

5. A method of twisting elongated filamentary material, comprising the steps of advancing a filamentary material in a predetermined path; contacting said filamentary material at least at one point of said path with a rotary body; transmitting to such body a first torque normally sufficient to rotate the body at a predetermined speed to thereby twist the filamentary material; and transmitting to the body a second torque in response to deviation of the actual speed of the body from said predetermined speed, so as to restore such actual speed to coincidence which said predetermined speed.

6. Apparatus for controlling the speed of a rotatable body, comprising, in combination, a rotatable body; first torque-producing means operatively associated with said rotatable body and arranged for transmitting to the same a first torque normally sufficient to rotate said body at a predetermined speed; and second torque-producing means operatively associated with said rotatable body and arranged for transmitting to the same a second torque in response to deviation of the actual speed of said body from said predetermined speed, to thereby restore such actual speed to coincidence with said predetermined speed.

7. Apparatus as defined in claim 6, wherein said rotatable body comprises a portion which constitutes a component of one of said torque-producing means.

8. Apparatus as defined in claim 6, wherein said second torque-producing means is an induction motor having a rotor; and wherein said rotatable body comprises a first portion, and a second portion which constitutes said rotor of said induction motor.

9. Apparatus as defined in claim 8, wherein said second portion is rigid with said first portion.

10. Apparatus as defined in claim 8, wherein said second portion is integral with said first portion.

11. Apparatus as defined in claim 7, wherein said first torque-producing means is a fluid-operated motor.

12. Apparatus as defined in claim 11, wherein said fluid-operated motor comprises an air turbine.

13. Apparatus as defined in claim 8, wherein said first torque-producing means is a fluid-operated motor comprising an air turbine having a rotor; and wherein said first portion of said rotatable body constitutes said rotor of said air turbine.

14. Apparatus as defined in claim 13, wherein said rotatable body is tubular.

15. Apparatus as defined in claim 13, wherein said body is substantially tubular and said first portion comprises a cylindrical enlargement provided with a plurality of angularly spaced peripheral recesses into which air under pressure can be directed.

16. Apparatus as defined in claim 15, wherein said cylindrical enlargement is located intermediate the axial ends of said substantially tubular body.

17. Apparatus as defined in claim 15, wherein said cylindrical enlargement comprises a pair of axially directed end faces and a peripheral face; and further comprising housing means defining an internal chamber accommodating at least said cylindrical enlargement with clearance between juxtaposed faces respectively provided on said enlargement and on the wall surrounding said chamber, such juxtaposed faces being adapted to constitute fluid-pressure bearing means for said rotatable body.

18. Apparatus as defined in claim 17; and further comprising air supply means for directing air under pressure into the clearance between respective juxtaposed axially directed faces on said enlargement and on said wall, whereby such faces co-operate to constitute axial thrust bearings for said rotatable body.

19. Apparatus as defined in claim 17, and further comprising air supply means for directing air under pressure into the clearance between respective juxtaposed radially directed faces on said enlargement and on said wall, whereby such faces co-operate to constitute radial thrust bearings for said rotatable body.

20. Apparatus as defined in claim 17, wherein said induction motor comprises a stator surrounding at least a part of said second portion of said rotatable body.

21. Apparatus as defined in claim 20, wherein said part of said second portion is a terminal portion of said rotatable body.

22. Apparatus as defined in claim 20, wherein said part of said second portion is located outside of said internal chamber.

23. Apparatus as defined in claim 8; and further comprising power supply means operatively connected with said induction motor for supplying power to the same.

24. Apparatus as defined in claim 23, wherein said power supply means comprise adjusting means for selectively varying the operating speed of said induction motor.

25. Apparatus as defined in claim 6, wherein said first torque-producing means is a fluid-operated motor; and further comprising a source of compressed fluid operatively connected with said fluid-operated motor for driving the same.

26. Apparatus as defined in claim 6, wherein said first torque-producing means constitute main driving means for said rotatable body, and wherein said second torque-producing means constitute auxiliary driving means.

27. Apparatus for twisting elongated filamentary material, comprising, in combination, filament supply means for supplying elongated filamentary material; filament takeup means spaced from said supply means; filament forwarding means operatively associated with said supply means for advancing filamentary material supplied by the same in a predetermined path and to said take-up means; and filament twisting means arranged along said path intermediate said forwarding means and said take-up means, said twisting means comprising a substantially tubular rotatable body located in said path surrounding a portion thereof so that the filamentary material passes through said tubular body in contact therewith, a first torque-producing arrangement operatively associated with said rotatable body and arranged for transmitting to the same a first torque normally sufficient to rotate the body at a predetermined speed and to thereby twist the filamentary material which is in contact with said body, and a second torque-producing arrangement also operatively associated with said rotatable body and arranged for transmitting to the same a second torque in response to deviation of the actual speed of said body from said predetermined speed, to thereby restore the actual speed of the body to coincide with said predetermined speed.

References Cited

UNITED STATES PATENTS

| | | | |
|---|---|---|---|
| 2,140,191 | 12/1938 | Schuchardt et al. | 74—5.43 XR |
| 2,463,619 | 3/1949 | Kunzle | 57—77.3 |
| 2,515,299 | 7/1950 | Foster et al. | 57—77.3 |
| 2,942,405 | 6/1960 | Ward et al. | 57—92 XR |
| 2,990,674 | 7/1961 | Stoll et al. | 57—77.45 XR |
| 3,173,259 | 3/1965 | Harbidge | 60—97 XR |
| 3,195,669 | 7/1965 | Court | 60—97 XR |
| 3,355,886 | 12/1967 | Weisenbach | 60—97 |
| 3,362,233 | 1/1968 | Posingies | 74—5.43 |

FRANK J. COHEN, *Primary Examiner.*

DONALD E. WATKINS, *Examiner.*